United States Patent
Kojima et al.

(10) Patent No.: US 6,387,309 B1
(45) Date of Patent: May 14, 2002

(54) METHOD OF MANUFACTURING A PRESS DIE MADE OF CONCRETE

(75) Inventors: Akihiko Kojima; Hiroshi Morita, both of Fujisawa; Kiyoshi Saito, Yamagata, all of (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/418,479

(22) Filed: Oct. 15, 1999

(30) Foreign Application Priority Data

Oct. 16, 1998 (JP) .......................... 10-295088

(51) Int. Cl.[7] .................. B29C 33/38; B29C 33/56; B29C 39/02; B29C 39/10; B29C 65/70
(52) U.S. Cl. .................. 264/139; 264/219; 264/225; 264/259; 264/265; 264/271.1; 264/274; 264/338
(58) Field of Search .................. 264/139, 219, 264/226, 338, 225, 265, 259, 271.1, 274

(56) References Cited

U.S. PATENT DOCUMENTS

| | | | |
|---|---|---|---|
| 1,691,721 A | * | 11/1928 | Johnson |
| 2,724,868 A | * | 11/1955 | Kish |
| 2,836,530 A | * | 5/1958 | Rees |
| 3,763,542 A | * | 10/1973 | Gutnajer .................. 29/400 |
| 4,205,040 A | * | 5/1980 | Aoyama et al. .................. 264/233 |
| 5,057,256 A | * | 10/1991 | Gorin .................. 264/113 |

FOREIGN PATENT DOCUMENTS

| | | | | |
|---|---|---|---|---|
| EP | 0341797 | | 11/1989 | |
| FR | 2654034 A1 | * | 5/1991 | ............. B28B/7/22 |
| JP | 63091208 | | 4/1988 | |
| JP | 1-242205 A | * | 9/1989 | ............. B28B/1/52 |
| JP | 8-47732 A | * | 2/1996 | ............. B21D/37/01 |
| JP | 08047732 | | 2/1996 | |
| JP | 10-193326 A | * | 7/1998 | ............. B28B/11/08 |
| JP | 11-28710 A | * | 2/1999 | ............. B28B/7/16 |
| SU | 698961 A | * | 11/1979 | ............. B28B/11/00 |

* cited by examiner

*Primary Examiner*—Jan H. Silbaugh
*Assistant Examiner*—Michael I. Poe
(74) *Attorney, Agent, or Firm*—Antonelli, Terry, Stout & Kraus, LLP

(57) ABSTRACT

A press die made of concrete having a surface layer bonded to the concrete, and a method manufacturing the same. A concrete member 60A is hardened through steam-curing. Thereafter, a surface material layer 70 is formed on a pressing surface of the concrete member 60A utilizing the aggregate 65 in the hardened concrete member 60A as an anchor.

9 Claims, 3 Drawing Sheets

METHOD OF MANUFACTURING A PRESS DIE MADE OF CONCRETE

FIELD OF THE INVENTION

The present invention relates to a press die mainly composed of concrete.

BACKGROUND OF THE INVENTION

Conventionally, a metallic die having abrasion-resistance and shock-resistance has been widely used as a press die.

When manufacturing a metallic die, a blank of the die taken out of a casting mold is provided with a finishing process such as grinding and the like. Thereafter, precision finishing is performed to the contact surface of the processed blank of the die, so as to complete the press die with which a product may be press-molded. However, the above-mentioned steps of manufacturing a metallic die involve large amount of labor and time, and therefore, are not economical.

A concrete material having high strength is now being used as a die material in forming a press mold for steel plates, since it is economically advantageous and may be manufactured in a short time.

However, when forming a press mold using a die formed of concrete material, the sliding of the steel plate is obstructed by the high frictional resistance of the concrete material. As a result, the steel plate has to stretch or extend more than when compared to molding by a die made of cast material. When the steel plate can not extend sufficiently, a crack may occur in the product (steel plate), or a scratch occur in the surface of the product, caused by hard, sharp particles included in the concrete.

Moreover, it is impossible from the characteristics of the concrete material to fill the necessary space of the die with concrete material to repair and improve the abrasiveness of the die.

Therefore, a press die is being developed in which a surface layer is applied to a pressing surface of the concrete material, in order to compensate for the insufficient abrasiveness of the concrete die (refer for example to Japanese Laid-Open Patent Publication No. 8-47732).

Now, a general method of manufacturing a press die made of concrete with a surface layer is explained with reference to FIGS. 8–10.

A. An enclosure 11 is placed around a casting mold 10 which creates the form.

B. A surface material 20 is applied above the casting mold 10 so that is has even thickness.

C. Anchors 21 are placed on the surface material 20, after the surface material 20 has hardened to a predetermined level (half-hardened).

Since the boundary surface (upper surface) of the surface material 20 is smooth unless roughened artificially, the bond with concrete is weak. Therefore, the anchors 21, made of materials having sufficient rigidity and to which the concrete material and the surface layer material cling easily, are placed densely in the surface layer 20, so as to bond the surface material to the concrete to be placed on the surface material, and to prevent exfoliation of the surface material therefrom.

D. Concrete 25 is inpoured to the surface material 20 equipped with anchors 21.

E. An atmospheric pressure steam-curing is performed.

F. The enclosure 11 is removed, and a press die 27 made of concrete to which the surface material 20 is bonded through anchors 21 is taken out of the casting mold 10.

The conventional press die 27 made of concrete has the following drawbacks.

After the surface material 20 and the concrete 25 are bonded, the steam-curing is performed in step E. Since the heat resistance temperature of the surface material is 60° C., the curing process is performed under the resistance temperature (60° C.), and so the compression strength of the die just after the curing process is low, and it takes time for the die to reach the intrinsic strength of concrete.

Moreover, since the curing process is performed after bonding the surface material 20 to the concrete 25, the difference in contraction between the concrete 25 and the surface material 20 leads to exfoliation of the surface material 20 from the concrete 25.

Even further, when performing a reversing process utilizing a master model, the concrete has to be hardened/cured after reversing the form of the concrete, so the size accuracy of the molding surface due to contraction of the concrete is poor.

SUMMARY OF THE INVENTION

The present invention aims at providing a press die made of concrete with improved size accuracy and improved adhesion characteristics of the surface material to the concrete, and a method of manufacturing the same by primarily hardening the base concrete member through steam-curing, and utilizing the aggregate included in the concrete as an anchor when bonding the surface material layer.

The press die made of concrete with a surface layer formed to a pressing surface of a concrete body according to the present invention includes the surface layer formed of synthetic resin bonded to the concrete body utilizing aggregate included in the concrete as the anchor.

Further, the method of manufacturing a press die made of concrete according to the present invention comprises a retardation means mounting step of placing a retardation means on a casting mold for the press die, a concrete filling step of filling an unhardened concrete above said retardation means, a primary hardening step of naturally hardening said concrete, a washing step of washing the portion of the hardened concrete member contacting said retardation means so as to expose aggregate, a secondary hardening step of steam-curing said hardened concrete member, and a surface layer forming step of forming a surface layer on the aggregate exposed surface of the hardened concrete member.

Moreover, the retardation means mounting step includes a step of mounting a means for retarding the hardening of concrete to the pressing surface.

Even further, the surface layer forming step includes steps such as pressing and adhering a surface material on the surface of said hardened concrete, forming said surface layer by inpouring a surface material to the space between the concrete surface and the casting mold for the press die, forming said surface layer by applying a surface material to the concrete surface, and the like.

According to any of the above processes, the surface material constituting the surface layer is bonded to the concrete member utilizing the aggregate comprised in said concrete member as the anchor.

PREFERRED EMBODIMENTS OF THE INVENTION

The embodiment of the press die made of concrete and methods of manufacturing the same according to the present invention will now be explained with reference to the drawings.

The method of manufacturing the press die made of concrete will be explained step by step.

Figure 1:
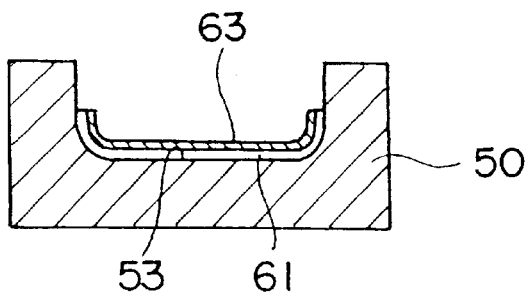
FIG. 1 is an explanatory view of the retardation means mounting step according to the present invention.

(1) Spacer Mounting Step (refer to FIG. 1)

A spacer 61 made of expanded polystyrene or the like having a thickness corresponding to the thickness of a surface material is placed and adhered to a concave surface 53 of a casting mold 50 having a concave shape.

(2) Retardation means mounting step (refer to FIG. 1)

A sheet 63 impregnated with a retarder is mounted on the upper surface of the spacer 61.

The retarder has a function to delay the hardening of the concrete.

Either an organic retarder such as oxycarboxylate or ketocarboxylate, or an inorganic retarder such as silicofluoride, is used as the retarder.

Further, instead of mounting the sheet 63, the retarder may be applied to the surface of the spacer 61.

Figure 2:
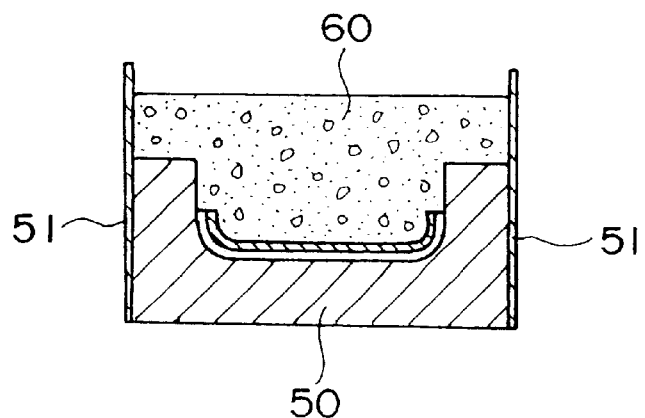
FIG. 2 is an explanatory view of the concrete filling step according to the present invention.

(3) An Enclosure 51 is Placed Around the Casting Mold 50 (refer to FIG. 2)

(4) Concrete Filling Step (refer to FIG. 2)

An unhardened concrete 60 is filled inside the enclosure 51.

The concrete 60 is a mixture of cement paste and aggregate. Normally, crushed stone or the like is used as the aggregate, and the mixture rate of the aggregate is 65–80% to the concrete volume. Various sizes of crushed stone are combined, and the aggregate utilizing crushed stone and the like normally has a strength exceeding that the cement paste, and therefore determines the strength of the concrete.

(5) Primary Hardening Step

The concrete is naturally hardened.

When the concrete is hardened, the hardened concrete member 60A is taken out of the mold form.

At this stage, the portion of the concrete contacting the retarder impregnated sheet 63 or the retarder applied to the spacer surface is not yet hardened.

Figure 3:
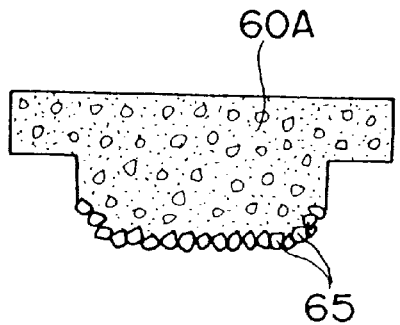
FIG. 3 is an explanatory view of the hardened concrete member in the state where the aggregate is exposed.

(6) Press Die Washing Step (refer to FIG. 3)

The retarder contacting surface of the concrete member 60A is washed, and aggregate (crushed stone) 65 in the concrete member 60A is exposed.

The concrete which had been contacting the retarder 63 and therefore has not yet hardened at this stage is removed through washing.

The unhardened cement has been removed through washing, and thereby, a hardened concrete member 60A exposing the aggregate 65 which is the component of the cement is formed.

(7) Secondary Hardening Step

The concrete member 60A having the aggregate 65 exposed is steam-cured.

The steam-curing is performed under a temperature of 80° C. for 12 hours.

(8) The Spacer 61 Mounted to the Concave Surface 53 of the Casting Mold 50 is Removed.

Figure 4:
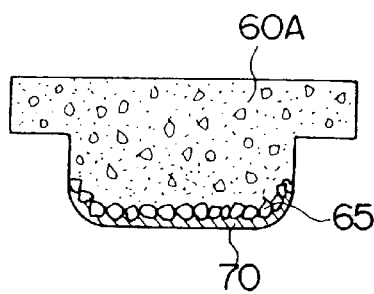
FIG. 4 is an explanatory view of the surface layer forming step according to the present invention.

(9) Surface Layer Forming Step (refer to FIG. 4)

A surface material layer 70 is formed to the surface of the concrete member 60A where the aggregate 65 is exposed.

The surface material is made of synthetic resin, and the surface layer 70 is fixed to the hardened concrete member 60A with the exposed aggregate 65 functioning as an anchor.

Methods of forming the surface layer 70 will now be explained.

Figure 5:
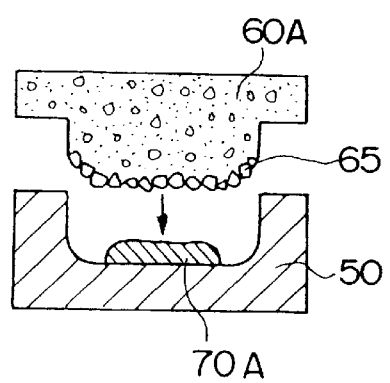
FIG. 5 is an explanatory view of another embodiment of the surface layer forming step according to the present invention.

Press-fix Method (refer to FIG. 5)

The surface material 70A for forming the surface layer is mounted on the die surface of the casting mold model 50 of the cast. The aggregate exposed surface is pressed and adhered to the surface material 70A. The surface material 70A fills the gap between the concrete member 60A and the casting mold 50, thereby forming a surface layer formed in the shape of the spacer with the aggregate 65 functioning as the anchor.

Figure 6:
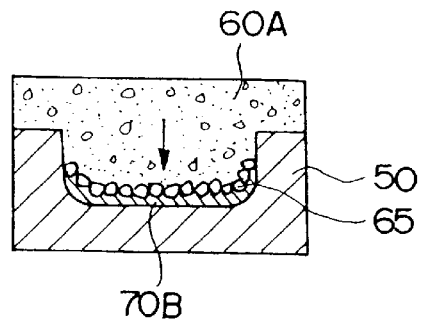
FIG. 6 is an explanatory view of yet another embodiment of the surface layer forming step according to the present invention.

Inpouring Method (refer to FIG. 6)

The hardened concrete member 60A is placed inside the casting mold model 50 of the cast, and the surface material 70B is inpoured into the gap formed between the concrete member 60A and the casting mold 50. The surface material 70B forms a surface material layer 70B utilizing the aggregate 65 as the anchor.

As explained above, a press die 100 made of concrete is created.

Further, according to the above embodiment, the aggregate functioning as the anchor is exposed on the surface of the concrete member using a retarder. However, in a simplified method, the contact surface of the surface layer may be made to have a rough surface by use of a grinder, or bolts or the like may be embedded to the concrete member as an anchor, and the base concrete may be hardened in advance, but according to the simplified methods, the bonding strength is reduced.

Next, the characteristics of the press die made of concrete is explained.

(a) There is no special technique concerned in mounting the retarder, since a sheet evenly impregnating the retarder is simply placed on the spacer mounted to the press forming concave surface 53 of the casting mold model 50. Further, even in an example where the retarder must be applied to the surface of the spacer, the retarder may be applied uniformly to the surface easily.

(b) The anchor may be placed easily and economically.

The aggregate 65 functioning as the anchor may be placed uniformly on the whole surface to which the surface layer 70 is to be fixed. Therefore, the bonding of the surface layer 70 to the concrete member 60A becomes firm.

Moreover, since the aggregate 65, which is a component of the concrete member 60A, is utilized as the anchor, the manufacturing cost may be cut down.

Even further, the step of placing the anchor during hardening of the concrete, which was necessary in the conventional method, is unnecessary according to the present method. Therefore, the present invention is free from limitations concerning time such as the adjustment of the degree of hardening, and also free from individual differences of the worker involved in placing the anchor.

(c) Since the surface layer 70 is formed on the secondary hardened concrete member 60A, sufficient strength may be obtained even at the initial time of manufacturing the die.

The secondary hardening of the concrete member 60A is performed under a sufficient temperature (80° C.), so a concrete having high compression strength and a sufficient intensity may be obtained in a short period of time.

Moreover, since the contraction of the concrete member 60A has already ended through the secondary hardening process before applying the surface layer 70, the shape of the surface layer may be reversed with high accuracy. Moreover, since the surface layer 70 is formed after the end of the contraction of the concrete member 60A due to the secondary hardening, the contraction difference between the concrete member 60A and the surface layer 70 is very small, and therefore, the surface layer 70 will not exfoliate from the concrete member 60A.

(d) The present press die may be repaired easily.

Figure 7:
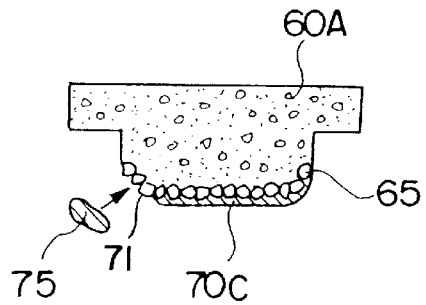
FIG. 7 is an explanatory view showing the surface layer repairing method according to the present invention.
Figure 8:
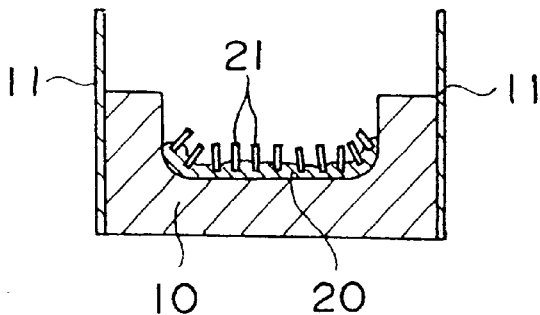
FIG. 8 is an explanatory view showing the method of manufacturing the press die made of concrete according to the prior art.
Figure 9:
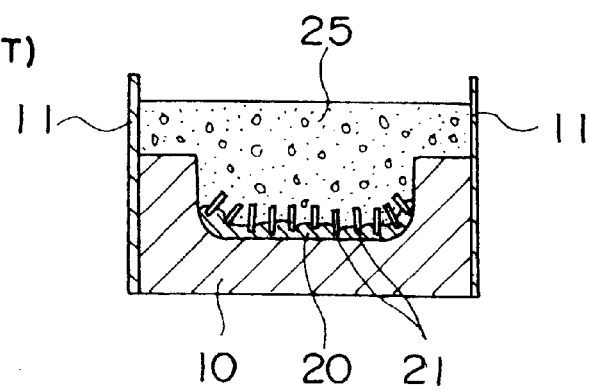
FIG. 9 is an explanatory view showing the method of manufacturing the press die made of concrete according to the prior art.
Figure 10:
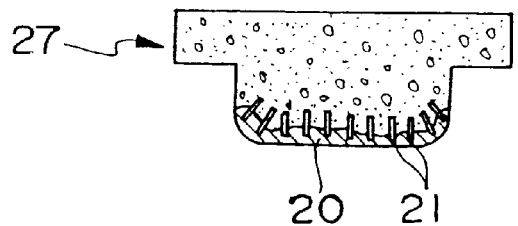
FIG. 10 is an explanatory view showing the method of manufacturing the press die made of concrete according to the prior art.

As shown in FIG. 7, when there is a need to repair a portion 71 of the surface layer 70C, the surface layer may be repaired easily by filling the area 71 with a repairing surface material 75. Since the aggregate 65 is exposed evenly, the aggregate 65 functioning as the anchor will exist in even small areas to be repaired, and therefore, a firm bond may be achieved between the repaired surface layer and the concrete member.

The press die made of concrete according to the present invention utilizes aggregate which is a component of the concrete as an anchor in bonding the surface material to the concrete, so a press die having a uniform strength may be provided economically.

Further, a solid press die may easily be manufactured by the method of manufacturing a press die made of concrete according to the present invention.

Moreover, since a secondary hardening step is carried out before forming a surface layer, no difference in shape of the concrete member and the surface layer due to a difference in contraction will occur. Therefore, a press die with a highly accurate size and having a firm bond between the concrete member and the surface layer may be provided.

We claim:

1. A method of manufacturing a press die made of concrete, including a concrete body and a surface layer bonded to a pressing surface of said concrete body, said method comprising:

placing a retardation means in a casting mold for the press die;

filling an unhardened concrete in said casting mold above said retardation means, said unhardened concrete including an aggregate;

naturally hardening said concrete to form a hardened concrete member;

removing the hardened concrete member from said casting mold;

washing a portion of the hardened concrete member contacting said retardation means to expose aggregate on a surface of said hardened concrete member;

steam-curing said hardened concrete member;

returning said hardened concrete member to said casting mold;

forming a surface layer on the aggregate exposed surface of said hardened concrete member while said hardened concrete member is within said casting mold; and removing said hardened concrete member with said surface layer thereon from said casting mold.

2. A method of manufacturing a press die according to claim 1, wherein said surface layer forming step comprises pressing and adhering a surface material onto the aggregate exposed surface of said hardened concrete member.

3. A method of manufacturing a press die according to claim 1, wherein said surface layer forming step comprises pouring a surface material into a space between the aggregate exposed surface of said hardened concrete member and said casting mold.

4. A method of manufacturing a press die according to claim 1, wherein said surface layer forming step comprises applying a surface material to the aggregate exposed surface of said hardened concrete member.

5. A method of manufacturing a press die according to claim 1, wherein said surface layer forming step comprises bonding said surface layer to the aggregate exposed surface of said hardened concrete member, with the exposed aggregate in the hardened concrete member serving as an anchor for the surface layer.

6. A method of manufacturing a press die according to claim 1, wherein said surface layer forming step comprises pressing and adhering a surface material onto the aggregate exposed surface of said hardened concrete member to bond said surface material to the aggregate exposed surface of said hardened concrete member, with the exposed aggregate in the hardened concrete member serving as an anchor for the bonding material.

7. A method of manufacturing a press die according to claim 1, wherein said surface layer forming step comprises pouring a surface material into the space between the aggregate exposed surface of said hardened concrete member and said casting mold, to bond said surface material to the exposed aggregate surface of said hardened concrete member, with the exposed aggregate in the hardened concrete member serving as an anchor for the surface material.

8. A method of manufacturing a press die according to claim 1, wherein said surface layer forming step comprises applying a surface material to the aggregate exposed surface of said hardened concrete member, to bond said surface material to the aggregate exposed surface of said hardened concrete member, with the exposed aggregate in the hardened concrete member serving as an anchor for the surface material.

9. A method of manufacturing a press die made of concrete, including a concrete body and a surface layer bonded to a pressing surface of said concrete body, said method comprising:

placing a retardation means on a casting mold for the press die;

filling an unhardened concrete in said casting mold above said retardation means, said unhardened concrete including an aggregate;

naturally hardening said concrete to form a hardened concrete member;

removing said hardened concrete member from said casting mold;

washing a portion of the hardened concrete member contacting said retardation means to expose aggregate on a surface of said hardened concrete member;

steam-curing said hardened concrete member;

returning said hardened concrete member to said casting mold such that a space is provided between the aggregate exposed surface of said hardened concrete member and said casting mold; and forming a surface layer on the aggregate exposed surface of said hardened concrete member by pouring a surface material into the space between the aggregate exposed surface of said hardened concrete member and said casting mold, to bond said surface material to the aggregate exposed surface of said hardened concrete member, with the exposed aggregate in the hardened concrete member serving as an anchor for the surface material.

* * * * *